(12) United States Patent
Bellamy et al.

(10) Patent No.: US 8,346,669 B2
(45) Date of Patent: Jan. 1, 2013

(54) METHOD OF REQUESTING A CUSTOMIZED INSTANCE OF AN OBJECT USING INFORMATION CONTAINED WITHIN AN EXISTING INSTANCE

(75) Inventors: Rachel K. E. Bellamy, Bedford, NY (US); Peter K. Malkin, Ardsley, NY (US)

(73) Assignee: International Business Machines Corporation, Armonk, NY (US)

( * ) Notice: Subject to any disclaimer, the term of this patent is extended or adjusted under 35 U.S.C. 154(b) by 747 days.

(21) Appl. No.: 12/247,337

(22) Filed: Oct. 8, 2008

(65) Prior Publication Data

US 2010/0088195 A1    Apr. 8, 2010

(51) Int. Cl.
*G06Q 30/00* (2012.01)
*G06F 21/00* (2006.01)

(52) U.S. Cl. .................. 705/75; 705/51; 705/56

(58) Field of Classification Search ............ 705/54, 705/61
See application file for complete search history.

(56) References Cited

U.S. PATENT DOCUMENTS

| | | | | |
|---|---|---|---|---|
| 3,670,310 A | * | 6/1972 | Bharwani et al. ............... 1/1 |
| 5,038,284 A | * | 8/1991 | Kramer ........................ 705/37 |
| 5,245,420 A | * | 9/1993 | Harney et al. ............... 725/104 |
| 5,418,713 A | * | 5/1995 | Allen ........................... 705/32 |
| 5,646,998 A | * | 7/1997 | Stambler ...................... 705/76 |
| 5,675,734 A | * | 10/1997 | Hair ............................ 705/51 |
| 5,710,887 A | * | 1/1998 | Chelliah et al. ............. 705/26.62 |
| 5,715,402 A | * | 2/1998 | Popolo ........................ 705/37 |
| 5,717,989 A | * | 2/1998 | Tozzoli et al. ................ 705/37 |
| 5,724,370 A | * | 3/1998 | Sferrazza et al. ............ 714/807 |
| 5,734,853 A | * | 3/1998 | Hendricks et al. ........... 715/716 |
| 5,774,873 A | * | 6/1998 | Berent et al. ................ 705/26.3 |
| 5,809,144 A | * | 9/1998 | Sirbu et al. .................. 705/53 |
| 5,835,896 A | * | 11/1998 | Fisher et al. ................ 705/37 |
| 5,850,442 A | * | 12/1998 | Muftic ........................ 705/65 |
| 5,864,620 A | * | 1/1999 | Pettitt ......................... 705/54 |
| 5,889,868 A | * | 3/1999 | Moskowitz et al. ......... 713/176 |
| 5,890,138 A | * | 3/1999 | Godin et al. ................ 705/26.3 |
| 5,960,411 A | * | 9/1999 | Hartman et al. ........... 705/26.81 |
| 5,970,472 A | * | 10/1999 | Allsop et al. ............... 705/26.81 |
| 6,012,045 A | * | 1/2000 | Barzilai et al. ............. 705/37 |
| 6,029,141 A | * | 2/2000 | Bezos et al. ................ 705/27.1 |
| 6,067,564 A | * | 5/2000 | Urakoshi et al. ............ 725/2 |

(Continued)

FOREIGN PATENT DOCUMENTS

WO    WO2007022109    2/2007

OTHER PUBLICATIONS

White, How Computers Work, 7th Ed. (Complete), 2004.*

*Primary Examiner* — Evens J Augustin
(74) *Attorney, Agent, or Firm* — Scully, Scott, Murphy & Presser, P.C.; Daniel P. Morris, Esq.

(57) ABSTRACT

A method and system for reselling an object in a client-server environment is disclosed. The method and system also enables a user using a client device can order an object, order a customized object, order a composite object, and order a customized composite object. The system includes an object order form handler, an object order handler, a view objects handler, a reseller form handler, a reseller handler, a reseller permission handler, an add object handler and a server database.

11 Claims, 5 Drawing Sheets

U.S. PATENT DOCUMENTS

| | | | |
|---|---|---|---|
| 6,098,056 A * | 8/2000 | Rusnak et al. | 705/75 |
| 6,119,229 A * | 9/2000 | Martinez et al. | 726/28 |
| 6,128,600 A * | 10/2000 | Imamura et al. | 705/26.41 |
| 6,144,743 A * | 11/2000 | Yamada et al. | 380/44 |
| 6,167,383 A | 12/2000 | Henson | |
| 6,189,098 B1 * | 2/2001 | Kaliski, Jr. | 713/168 |
| 6,226,618 B1 * | 5/2001 | Downs et al. | 705/51 |
| 6,263,318 B1 * | 7/2001 | Kimura et al. | 705/26.1 |
| 6,317,830 B1 * | 11/2001 | Stolz | 713/168 |
| 6,330,550 B1 * | 12/2001 | Brisebois et al. | 705/75 |
| 6,343,738 B1 * | 2/2002 | Ogilvie | 235/381 |
| 6,356,878 B1 * | 3/2002 | Walker et al. | 705/26.81 |
| 6,363,357 B1 * | 3/2002 | Rosenberg et al. | 705/51 |
| 6,385,596 B1 * | 5/2002 | Wiser et al. | 705/51 |
| 6,389,403 B1 * | 5/2002 | Dorak, Jr. | 705/52 |
| 7,236,947 B2 | 6/2007 | Eckert et al. | |
| 7,640,186 B1 * | 12/2009 | Fraser et al. | 705/26.35 |
| 2001/0002485 A1 * | 5/2001 | Bisbee et al. | 713/167 |
| 2001/0034673 A1 * | 10/2001 | Yang et al. | 705/28 |
| 2001/0049647 A1 * | 12/2001 | Sheehan et al. | 705/37 |
| 2002/0007322 A1 * | 1/2002 | Stromberg | 705/26 |
| 2002/0013765 A1 * | 1/2002 | Shwartz | 705/39 |
| 2002/0023058 A1 * | 2/2002 | Taniguchi et al. | 705/57 |
| 2002/0049641 A1 * | 4/2002 | Kopelman et al. | 705/26 |
| 2002/0138439 A1 * | 9/2002 | Matsushima et al. | 705/52 |
| 2003/0120550 A1 * | 6/2003 | Peyrelevade et al. | 705/26 |
| 2005/0198677 A1 * | 9/2005 | Lewis | 725/87 |
| 2008/0172747 A1 * | 7/2008 | Hurtado et al. | 726/26 |
| 2009/0132815 A1 * | 5/2009 | Ginter et al. | 713/164 |
| 2009/0198536 A1 * | 8/2009 | Hamilton et al. | 705/7 |
| 2009/0216623 A1 * | 8/2009 | Hendricks et al. | 705/10 |

* cited by examiner

METHOD OF REQUESTING A CUSTOMIZED INSTANCE OF AN OBJECT USING INFORMATION CONTAINED WITHIN AN EXISTING INSTANCE

BACKGROUND OF THE INVENTION

1. Field of the Invention

The present invention generally relates to e-commerce, and particularly, to improvements to on-line ordering of objects (e.g., hardware (e.g., a car, a boat, etc.), software (e.g., widget (i.e., an element of a graphical user interface such as buttons, icons or scroll bars; a module of software for a personalized web page)) and services (e.g., a cleaning service or gardening service)). More particularly, the present invention is related to reselling an object and/or to ordering a customization of an existing instance (e.g., when a book is an object, a copy of the book is an instance of the object) of an object for a subsequent resale.

2. Description of the Related Art

A client-server environment refers to a network architecture comprising a plurality of client devices and one or more of server devices. The client devices are defined as requesters of services. The server devices are defined as providers of the services. The client devices and the server devices are connected through physical links or wireless links.

In day-to-day activities, people often see an existing instance of an object (e.g., when a book is an object, a copy of the book is an instance of the object). Then, a person may want to have the same instance of the object (e.g., exactly same copy of the book with identical attributes (e.g., same author, same publisher, same publication date, same number of pages, same ISDN number, same cover page, same price, same format, etc.), or, may want to have a slightly different instance of the object (e.g., a copy of the book with a different publication date, different cover page, different publisher, different format, and/or different price), or, may want to have a customized instance (e.g., a copy of the book with a cover page designed per a request from a customer) of the object. However, ordering a customized instance (e.g., a copy of the book with a cover page designed per a request from a customer) of the object is not convenient in existing technology (e.g., e-catalog and on-line shopping). Moreover, it is difficult to find a procedure to order the customized instance of the object and/or find out whether a customization of the existing instance of the object is possible or not.

Henson (U.S. Pat. No. 6,167,383) discusses customizing a computer device via a user interface. In the user interface, a user can select a memory device among a variety of memory devices and/or can select a processor among a variety of processors. However, Henson does not discuss any ability to customize a software object (e.g., a widget) and a service object (e.g., a gardening service) displayable via a client device (e.g., a desktop or laptop). Furthermore, Henson neither discusses a method nor a system for reselling (i.e., selling (a product, object or service) to the public or to a user, as an authorized dealer) an object.

Eckert et al. (U.S. Pat. No. 7,236,947) (hereinafter "Eckert") discusses that a computer system receives a purchase request from a first trading partner, and in response, automatically selects at least one qualified trading partner among available trading partners, generates a purchase order based on the purchase request, and forwards the purchase order to the selected qualified trading partner. However, Eckert does not discuss a customization of an object. Furthermore, Eckert neither discusses a method or system for reselling an object.

Vaysman et al. (WO 2007/022109 or PCT/US2006/031694) (hereinafter "Vaysman") discusses methods for generation and usage of unique content identifiers that allow users to find and select desired network or locally stored content or applications. Vaysman further discusses browsing content and selecting content. However, Vaysman does not discuss a customization of an object. Furthermore, Vaysman neither discusses a method or system for reselling an object.

It would be desirable to provide a system and method for reselling an object and ordering a customized object in a client-server environment or a web-based e-commerce infrastructure.

SUMMARY OF THE INVENTION

The present invention is a system and method for reselling an object and customizing an object in a client-server environment, where the object is hardware, software or service. The object can be a composite object (i.e., an object comprising subobjects; e.g., a computer comprising a memory device, a processor, a hard disk, etc.).

In one embodiment, there is provided a server device for reselling an object in a client-server environment including a plurality of client devices comprising:

a reseller form handler for receiving from a client device a request of a reseller form corresponding to the object, generating the reseller form corresponding to the object and providing the reseller form to the client device;

a reseller handler for receiving a request to be a reseller from the client device that completed the reseller form and forwarding the request to be the reseller to an original seller; and a reseller permission handler for receiving a determination of the request to be the reseller from the original seller, storing the determination in a database and sending the determination to the client device, wherein if the determination indicates an approval of the request to be the reseller, a user of the client device is able to resell the object to other users at other client devices.

In another embodiment, there is provided a method in a server device for reselling an object in a client-server environment including a plurality of client devices comprising:

receiving from a client device a request of a reseller form corresponding to the object, generating the reseller form corresponding to the object and providing the reseller form to the client device;

receiving a request to be a reseller from the client device that completed the reseller form and forwarding the request to be the reseller to an original seller; and receiving a determination of the request to be the reseller from the original seller, storing the determination in a database and sending the determination to the client device, wherein if the determination indicates an approval of the request to be the reseller, a user of the client device is able to resell the object to other users at other client devices.

In a further embodiment, an object order form is provided to the client device upon a request. After completing the object order form, the client device submits an order of an object, a customized object and/or a composite object. The order from the client device is sent to a seller.

In a further embodiment, the object order form is provided to the client device via a web site (e.g., FTP site), an email (e.g., an attachment), a phone call (e.g., a conversation regarding contents or requirements of the object order from), a fax, an instant messaging, a postal mail and a carrier service (e.g., UPS™, FedEx™, DHL®).

The present invention has at least following advantages over traditional solutions:
- A user can order a customized instance of an object by specifying how the user wants the customization is done.
- A user can resell an (customized) instance of an object which the user purchased before, after obtaining a permission to resell the instance of the object.
- A user can order a customization of a composite object.

BRIEF DESCRIPTION OF THE DRAWINGS

The accompanying drawings are included to provide a further understanding of the present invention, and are incorporated in and constitute a part of this specification. The drawings illustrate embodiments of the invention and, together with the description, serve to explain the principles of the invention. In the drawings.

DETAILED DESCRIPTION OF THE INVENTION

An object in the present invention refers to hardware (e.g., a television, a radio, a cellular phone, etc.), software (e.g., a widget) and/or services (e.g., a mail forwarding service). In a context of a hardware object, an instance of the object means a same physical device/machine corresponding to the object. For example, when a hardware object is an Apple® iPhone™, the instance of the object is another Apple® iPhone™ with same software and hardware configuration of the prior iPhone™. In a context of a software object an instance of the object means a same reproduction of the object. For example, when a software object is an icon on a web page, an instance of the object is an identical imitation of the icon with same attributes (e.g., same length, same color, same author/creator, same shape, etc.). In a context of a service object, an instance of the object refers to performing a duplicate task or act pertaining to the object. For example, a service object is a gardening service, an instance of the object is another gardening service with same properties or characteristics (e.g., identical step(s), performances, task(s), cost(s), labor(s), duration(s), energy consumption(s)) of the prior gardening service. In Object Oriented Programming (OOP), a Class in OPP refers to an object in the present invention. An Object in OPP refers to an instance of the object (e.g., Class in OPP) in the present invention. In one embodiment of the present invention, the object refers to a name or an identity of hardware, software and/or a service. The instance of the object in the present invention refers to an actual realization or implementation of a corresponding hardware, software and/or service.

Figure 1:
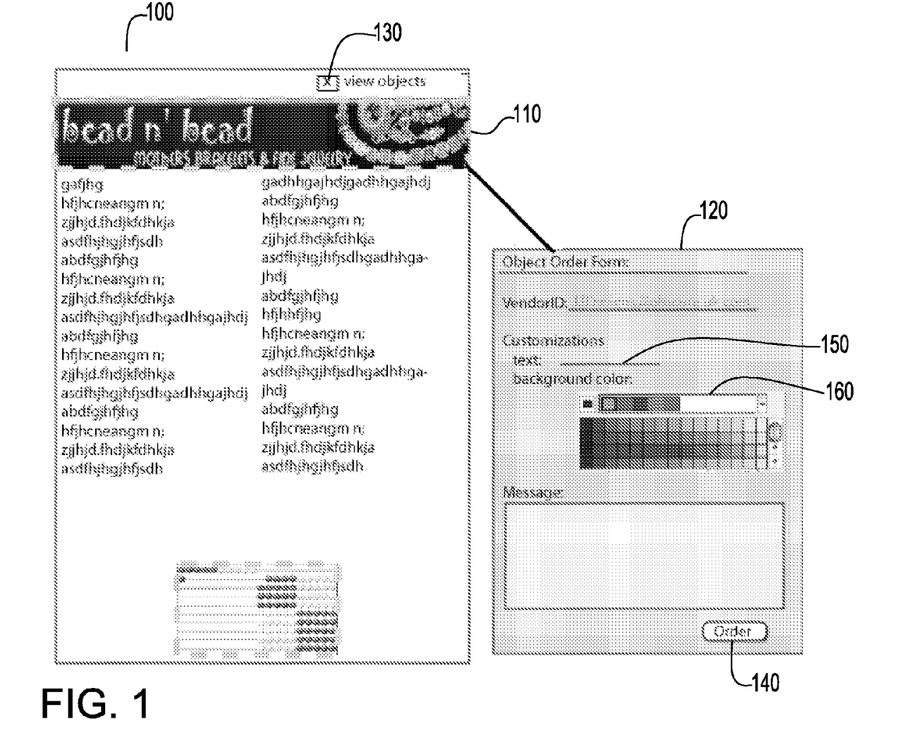
FIG. 1 depicts an example of invoking an object order form to order a customized object.

FIG. 1 illustrates an exemplary embodiment of the present invention. In this exemplary embodiment, a web page 100 created by a first user includes customizable objects (e.g., a highlighted object 110 with dotted lines) of which a viewer of the web page can select and submit an order to purchase an object through the web page, an email, a phone call, a fax, an instant messaging, a postal mail and/or a carrier service.

Continuing on this exemplary embodiment, a second user visits the web page and has an interest on the customizable objects posted on the web page. To see which objects are orderable, the second user clicks a "view objects" check box 130 provided in the web page 100. Then, objects (e.g., an object 110) that can be ordered are visibly distinguished (e.g., outlined in dotted lines). The second user is then enabled to right-click on an object (e.g., an object 110) that is visibly distinguished. Then, a pop-up menu (not shown) appears and the second user selects an "order object" link (not shown) on the pop-up menu. As a result of selecting the "order object" link, an object order form 120 appears as shown in FIG. 1. Via the object order form 120, the second user can specify how that user wants to customize the object (e.g., by changing colors, size, shape, length, text, etc.). If the object order form 120 is a blank page, the second user may enter a description of how the second user wants to customize the object. If the object order form 120 has drop-down menu(s), the second user selects his preferences on the drop-down menus. In this exemplary embodiment, the object order form 120 includes a multiple fields such as seller contact information, customization options and a message box (i.e., a text entering field).

The seller contact information (the seller is the first user who created the web page 100, a current owner of the object and/or a creator/designer of the object) comprises, but is not limited to include, the seller's email address, phone number, fax number and office address. The customization options comprise, but are not limited to include: customizing text, customizing color, customizing shape, customizing font and customizing length or other dimension of the object (e.g., widget). In the message box, a user (e.g., the second user) can describe his additional request (e.g., a delivery date, a fast order) or attach a reference document that can help the seller when customizing the object. The customization options can include a variety attributes of the object that can be customized. The attributes comprise, but are not limited to include: color (e.g., a color customization 160 in FIG. 1), size, shape, length, text (e.g., a text customization in FIG. 1) and font. The attributes that can be customized may be selected by an object creator, object designer or a seller. Customizing an attribute of an object can have a flat rate (i.e., a seller charges a same price for customizing an attribute of an object regardless of any attribute) or can have flexible rate (i.e., a seller determines a price for customizing an attribute of an object depending on a difficulty of the customization). The object order form 120 may reflect a cost for customizing the object based on the flat rate or flexible rate. The cost on the object order form 120 may include delivery fee, labor fee, tips and taxes. The cost on the object order form 120 can be determined by a seller, an object creator (i.e., a person who created the object to be customized), an object designer (i.e., a person who designed the object to be customized), and/or a reseller (i.e., a person who wants to resell the object).

Continuing on this exemplary embodiment, after completing the object order form 120, the second user pushes/selects/clicks an order button 140. Upon pushing/selecting/clicking the order button 140, the second user may be directed to a payment section (e.g., a section where a user can pay a cost for customizing an object), so he can make a payment for customizing the object. The payment section can be connected to an existing payment service (e.g., PayPal®) or can be a stand-alone web page/site for enabling a user (e.g., the second user) to make a payment. At the payment section, a user pays using a money order, credit card, debit card, traveler's check etc. After the second user making a payment at the payment section, the customized object is subsequently delivered to the second user by using one or more of: an email (e.g., an attachment), postal mail and carrier service. In one embodiment, after the second user making the payment, the customized object can be delivered to the second user or a client device that the second user is using, e.g., a couple of days or hours later, because it can take times to customize the object. If the customized object is retrieved from a database storing the object, the customized object can be immediately delivered to the second user upon confirming the second user made a payment. After receiving the customized object, the second user can use the customized object in any manner as desired. If the customized object has a restriction of usages, the customized object can include information (e.g., document) of the restriction of usages. When the second user wants to sell the customized object, the second user may first need to obtain a permission to resell from an original seller and/or an object creator (i.e., a person who customized the object). Upon receiving a permission to resell the customized object, the second user can offer the customized object for sale online (e.g., ebay®) and/or off-line (e.g., a supermarket in the second user's neighborhood).

Some sellers or object creators may allow object purchasers (i.e., a person who bought a customized object) to resell the customized object. When allowing reselling the customized objects, the seller(s) and/or object creator(s) may give up a commission (i.e., require no commission) or, require a commission (i.e., a fee or percentage (of the reselling price) to be assigned to the object seller(s) and/or the object creator(s) upon reselling the object). If the customized object comprises subobjects (i.e., parts of a component; subparts; objects used for constructing an object), the seller(s) and object creator(s) may require a commission for every subobject in the customized object. The customized object may include a unique ID (not shown) such as RFID (Radio Frequency Identification), barcode and URI (Uniform Resource Identifier). Therefore, by utilizing the unique ID (e.g., RFID tag) on the customized object, the seller(s) and object creator(s) can trace where the customized object is used, applied, and/or resold. The unique ID on a customized object can provide information of a change of ownership of the customized object to the seller(s) and/or the object creator(s), because the unique ID utilizing RFID technology can report the seller(s) and/or the object creator(s) when a customized object is transmitted or transported to a new place. Therefore, if the customized object is resold and/or redesigned without a permission of the seller(s) and/or object creator(s), the seller(s) and/or object creator(s) can contact a current owner of the customized object or a previous owner of the customized object to request a commission of reselling the customized object or to notify an improper ownership transfer due to unauthorized reselling. The customized object can have a lock to prevent a further customization. In one embodiment, the lock is implemented as software, hardware or a combination of them based on an encryption/description technology (e.g., DES (Data Encryption Standard), Nimbus, TEA (Tiny Encryption Algorithm)). The lock can be configured to be released only by the seller(s) and/or the object creator(s), who know keys or passwords of the lock. The customized object can have a feature for disablement of the customized object. When the seller(s) and/or object creator(s) receives notifications that an unique ID on a customized object represents a user's unauthorized reselling the customized object, the seller(s) and/or the object creator (s) can activate the disablement feature (e.g., deleting a customized widget upon detecting illegal ownership transfer, activating/spreading virus or malicious codes upon detecting illegal ownership transfer of a customized widget, locking all vehicle doors upon detecting illegal ownership transfer of a customized vehicle) in the customized object.

When a user (e.g., a current owner of an object) wants to be a reseller of an object (e.g., an existing object or a customized object), the user sends a request to be a reseller of the object to a server device (e.g., a computing device including a database storing objects, contact information of sellers of objects, contact information of owners of objects, contact information of creators of objects) associated with the object. In one embodiment, the user directly contact the (original) seller and/or the object creator, if the user finds out contact information (e.g., URI) of the seller and/or the object creator of the object which the user wants to resell. When the server device receives the request to be a reseller (not shown) of the object, the server device forwards the request to be reseller to the (original) seller and/or the object creator. In one embodiment, the request to be reseller includes, but is not limited to include, a description of the object (e.g., when that user (e.g., a current owner of the object) first purchased the object, a unique ID of the object) and contact information of the user. When the request to be reseller is delivered to the (original) seller and/or the object creator, the seller and/or the object creator determines whether to grant the user a permission to be a reseller or not. In one embodiment, the request to be the reseller includes information of a commission (i.e., the (original) seller and/or the object creator receives a certain portion of reselling price). Based on the commission information in the request to be reseller, the sellers and/or object creators determine whether the permission is granted or not. In another embodiment, the seller and/or object creator specifies a commission amount (e.g., 5% of reselling price) when granting the permission. The specified commission amount is stored in a database in the server device associated with a unique ID of the object. In one embodiment, granting a user (e.g., a current owner of the object) a permission to resell an object includes transferring a copyright ownership, trademark ownership or intellectual property ownership associated with the object from the (original) seller and/or the object creator to the user (e.g., the current owner of the object).

In one embodiment of the present invention, a user can order a composite object that is composed of multiple separate orderable subobjects. The subobjects can be an existing objects and/or customized objects. In one exemplary embodiment, the third user posted an orderable flash animation movie D composed of three short flash animation movies (e.g., an animation movie A, an animation movie B, an animation movie C) on his web site. The third user is a creator of the animation movies A and B. The fourth user is a creator of the animation movie C. The third user is also a composer who combined the three animation movies A, B and C to create the orderable animation movie D. When the second user visits the third user's web site, the second user becomes interested in ordering the flash animation movie D. However, the second user wants a change at the first part of the movie D and a last part of the movie D.

Continuing this exemplary embodiment, the second user issues an order of the movie D with the change of the first part and the last part. The second user may issue the order of the movie D by clicking an order button (not shown) next to the movie D or contacting the third user by email, a phone, an Instant Messaging, a FAX or a carrier service. When the second user clicks the order button, a composite object order form, which is similar to the order form 102 of FIG. 1, may appear. The composite object order form comprises, but is not limited to include, the third user's contact information (e.g., email address, phone number, FAX number, etc.), customization options (e.g., deleting/modifying some portions of the movie D) and a message box (i.e., a blank box where the second user can describes an additional request). The second user completes the composite object order form with a request to change background music at the first part of the movie D and a request to make last 3 minutes of the movie D as black and white images. After the second user completes the composite object order form, by clicking a "done" button (not shown) on the composite object order form, the composite object order form is delivered to the third user. In another embodiment, the second user can send the completed composite object order form to the third user by an email, postal mail, FAX and a carrier service.

Upon receiving the composite object order form from the second user, the third user recognizes that changing background music at the first part of the movie D refers to changing background music of the animation movie A. The third user also recognizes making black and white images for last 3 minutes of the movie D refers to making the animation movie C as a black and white movie. Because the third user is the creator of the animation movie A, the third user starts to work on changing background music of the animation movie A. However, because the fourth user is creator of the animation movie C, The third user contacts the fourth user to request modification on the animation movie C.

In another exemplary embodiment, there is no need of an intervention from a composer the third user. When the composite object order form is completed, the completed object order form is transmitted to a server device which manages customizations of subobjects (e.g., three animation movies A, B and C) and contact information of creators and a composer. By parsing and analyzing contents of the completed composite object order form from the third user, the server device finds out that background music of the animation movie A needs to be changed and finds out that the animation movie C needs to be a black and white movie. Then, the server device contacts (e.g., via email or FAX) the third user with a request. The request sent to the third user provides the request to change the background music in the animation movie A, to wait for a modification of the animation movie C from the fourth user and to combine the changed movie A', the original movie B and the modified movie C' to create a customized flash animation movie D'. The server device also contacts the fourth user with a request. The request sent to the fourth user may describe making the animation movie C as a black and white movie and then sending the black and white movie to the third user.

After the third user completes changing the background music in the animation movie A and receives the black and white movie from the fourth user, the third user combines the changed movie A' (an animation movie A with a different background music), the animation movie B and the black and white movie (a black and white movie of the animation movie C) from the fourth user to create a customized flash animation movie D' based on The second user's completed composite object order form. Then, the customized flash animation movie D' is directly delivered to the second user from the third user via an email, a postal mail and a carrier service. In another exemplary embodiment, the third user sends the customized flash animation movie D' to the server device. Then, the server device assigns a unique ID on the customized flash animation movie D', stores the movie D' in a database, and sends the movie D' to the third user via an email or an instant messaging.

In another exemplary embodiment, the third user can make a modification on the animation movie C, if the fourth user issues a permission to the third user to make a change on the animation movie C. In a further exemplary embodiment, if the second user wants to resell the customized flash animation movie D', the second user accesses the server device associated with the unique ID (e.g., URI) and requests a permission to resell the animation movie D'. Then, the server device will forward a request to be a reseller to the third user who is the creator of the animation movie A' and the animation movie B and the composer and the fourth user who is the creator of the black and white movie. Upon receiving the permission to resell from the third user and the fourth user, the server device calculates a proper commission (e.g., a creator receives 5% of reselling price, a composer receives 3% of reselling price) for each creator and the composer. When sending permission to resell the animation movie D' (e.g., a composite object), the server device informs the second user of commissions for the third user and the fourth user.

In one embodiment, an object (e.g., an existing object, a customized object, a composite object, a subobject) includes a unique ID (e.g., a barcode, a URI, a RFID). Through the unique ID (e.g., accessing the URI on the object), a user is enabled to communicate with a seller of the object, a current owner of the object, and/or a creator of the object and how to request an instance of the object.

In one embodiment, there is a server device which stores and accesses optional information of an object which is accessed via a unique ID stored as a part of the object. The optional information comprises, but is not limited to include, a cost of an instance of the object, possibility of customizations of the object, whether the object can be resold, how much a reseller needs to provide an original seller and/an object creator as commissions, a reseller ID (e.g., an email address of the reseller, a cellular phone number of the reseller), a payment service (i.e., enabling a person to pay the cost to purchase the object by a credit card, a debit card, etc.) and unique IDs of subobjects if the object is a composite object.

In one embodiment of the present invention, the server device (i.e., a computing device managing a database of objects, sellers, current owners, etc.) generates an object order form for an instance of the object based on the unique ID for an object as shown FIG. 1 upon receiving a request of the object order form from a user (e.g., customer) or a client device that the user is operating. After the user completes the object order form and provides the completed object order form to the server device, the server device delivers an order of the object (e.g., the completed object order form) to a registered seller via an instant messaging, an email, a postal mail, a carrier service, a phone call, a FAX, etc. The object order form may use the optional information associated with the unique ID of the object and may include optional customizations (e.g., changing colors, texts, sounds, etc.) of the object.

One embodiment of the present invention allows a current owner of an object to become a reseller of the object. Upon receiving a request to be a reseller of the object, a reseller request form (i.e., a form that a client needs to fill out to be a reseller of the object) associated with the object is retrieved or generated from the server device and is delivered to the current owner via one or more of an email, a FAX, a postal mail, an instant messaging and a carrier service. The reseller request form may include commission information (e.g., how much the reseller needs to pay to an original seller when reselling the object). This commission information may be stored in the database associated with a unique ID of the object. When the server device receives a completed reseller request form, the server device also retrieves or generates a reseller request (i.e., a request to be a reseller) based on the completed reseller request form and delivers the reseller request to the original seller. In one embodiment, the server devices forwards the completed reseller request form to the original seller. When the original seller approves the reseller request, the server device generates a reseller permission form (i.e., a form acknowledging an approval of a request to be a reseller), sends the reseller permission form to the current owner of the object, and stores the reseller permission form and the reseller's information (e.g., contact information of the current owner of the object) in a database associated with the unique ID of the object.

In one embodiment of the present invention, an object can be composed of several subobjects. This object (i.e., an object composed of several subobjects) is called as a composite object. When a composite object is ordered from a client, a server device managing the composite object generates separate orders for each subobject based on a unique ID in each subobject. The server device also generates an order for combining each subobject to create the composite object. Then the server device delivers orders for subobjects to corresponding sellers whose contact information can be found in database(s) associated with unique IDs of the subobjects. The server device also delivers an order for combining each subobject to a composer whose contact information can be in a database associated with a unique ID of the composite object.

Figure 2:
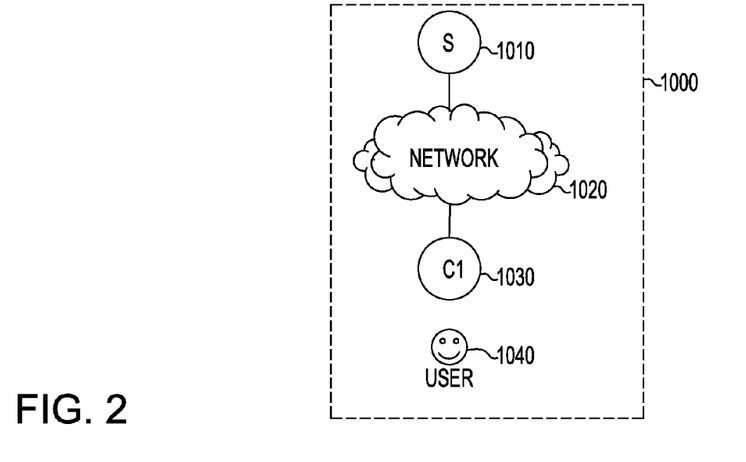
FIG. 2 depicts a client-server environment where the present invention is employed.

FIG. 2 illustrates a client-server environment where one embodiment of the present inventions is employed. A user 1040 utilizes a client device 1030 to communicate with a server device 1010 via a network 1020. Although there is one client device 1030 in FIG. 1, there can be a plurality of client devices and a plurality of server devices. The plurality of client devices and the plurality of server devices can be connected through a plurality of networks. The client device 1030 is a computing device or a computing machine (e.g., a personal computer, a desktop computer, a laptop computer (e.g., IBM® ThinkPad®), a mainframe, a smart phone (e.g., Apple®iPhone®), a PDA and IPTV (Internet Protocol Television)) including a web browser (e.g., Microsoft® Internet Explorer®, Apple® Safari®). The user 1040 is an ordinary person who knows how to use the computing device/machine and knows how to access Internet but may not be a programmer. The server device 1010 is also a computing device or a computing machine (e.g., a personal computer, a desktop computer, a laptop computer (e.g., IBM® ThinkPad®), a mainframe and a workstation). In one embodiment, the server device includes a storage device for a database. In one embodiment the server device 1010 acts as a web server (e.g., HTTP server (e.g., Apache HTTP server) or UDP (User Datagram Protocol) server). The client device 1030 acts as a web client (e.g., HTTP client or UDP client). The network 1020 is one or more of: Internet, an internal intranet, a wireless network, a wired network, ATM (Asynchronous Transfer Mode) network, a peer-to-peer network, a publish/subscribe network, an overlay network, etc. The server device 1010 is described in detail with respect to FIGS. 3-5.

Figure 3:
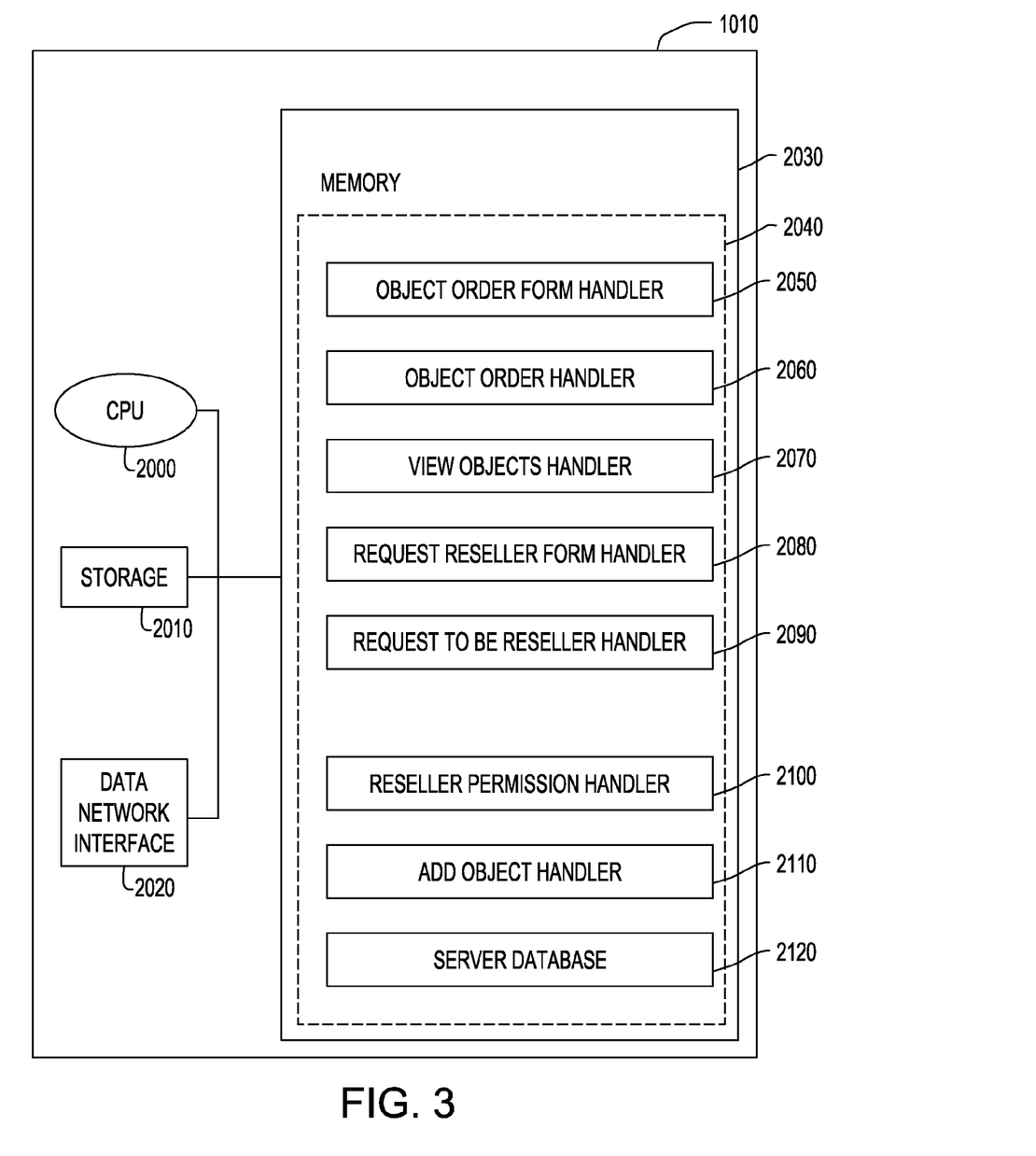
FIG. 3 depicts a block diagram of a server device in one embodiment of the present invention.

FIG. 3 illustrates a system diagram of the server device in one embodiment of the present invention. The server device 1010 comprises, but is not limited to include, a processor 2000 (Intel® Core™ 2 processor, IBM® PowerPC® processor, IBM® Cell Processor), a storage device 2010 (e.g., optical storage device (e.g., CD-ROM), solid-state drive (SSD), magnetic storage device (i.e., hard disk drive)), a data network interface card 2020 (e.g., Ethernet over coax cable, wireless IP and VoIP (e.g., DVG-1402S Broadband Phone Service VoIP Router from D-Link®), an operating system (not shown) (e.g., Windows Server®, Linux operating system, SUN Microsystems Solaris®, FreeBSD), sever application suite (not shown) (e.g., database, http server, file and printer sharing), a memory 2030 (e.g., SRAM, DRAM, SDRAM) and a system logic 2040 (i.e., a logic for managing ordering an object, reselling an object, customizing an object, etc.). The system logic 2040 comprises an object order form handler 2050, an object order handler 2060, a view objects handler 2070, a request reseller form handler 2080, a request to be reseller handler 2090, a reseller permission handler 2100, an add object handler 2110 and a server database (e.g., Oracle® database). FIG. 3 depicts that the handlers 2050-2110 and the server database 2120 are implemented in the memory 2030 and are executed by the processor 2000.

In one embodiment, the handlers 2050-2110 in the system logic 2040 are implemented as hardware on a reconfigurable hardware (e.g., FPGA (Field Programmable Gate Array) or CPLD (Complex Programmable Logic Device)) using a hardware description language (Verilog, VHDL, Handel-C, or System C). In another embodiment, the handlers 2050-2110 in the system logic 2040 are implemented on a semiconductor chip (e.g., ASIC (Application-Specific Integrated Circuit)) using a semi custom design methodology (i.e., designing a chip using standard cells and a hardware description language).

In one embodiment, the handlers 2050-2110 in the system logic 2040 are implemented as software using a programming language (e.g., C, C++, Java, NET, etc.). In one embodiment, the handlers 2050-2110 in the system logic 2040 are recorded in a computer recordable medium (e.g., CD (Compact Disk), DVD (Digital Versatile Disc), HDD (Hard Disk Drive)) as an instruction (e.g., a machine language or assembly language) that is executed by a processor (e.g., Intel® Pentium®, IBM® Power PC®, AMD® Operon®).

In one embodiment, the handlers 2050-2110 in the system logic 2040 are implemented as hardware through a computing device (e.g., a server device 1010) by being executed in the computing device. The computing device comprises, but not limited to include, processor(s) 2000, memory(s) 2030, display device(s) (not shown), input/output device(s) (not shown) and network interface(s) 2020.

The view objects handler 2070 receives a request of viewing an object from a client device. Then, the view objects handler 2070 finds the object in a web page and modifies the web page by adding a mark-up (e.g., a visually distinguishable marks, lines or symbols; e.g., dotted lines; e.g., an object 110 being distinguished over other objects because of dotted lines) on objects to indicate the mark-up objects (i.e., objects having the mark-up; an object 110 in FIG. 1) can be ordered, customized or resold. In one embodiment, each different mark-up is used to distinguish an orderable object, an orderable and customizable object and an orderable customizable and resalable object. In one embodiment, the mark-up includes information (e.g., objectID, sellerID) necessary for ordering an object associated with the mark-up. In one embodiment, the mark-ups are pre-defined by seller(s) of the objects. The modified web page with mark-up(s) is provided from the view objects handler 2070 to the client device which sent the request of viewing an object.

In one embodiment, the view objects handler 2070 receives a web page URI (e.g., Uniform Resource Locator (URL)) as an input from a user associated with a client device. The URI may be retrieved from a unique ID of an object. After receiving the URI from the user through the client device, the view objects handler 2070 finds all objects in the URI and adds a mark-up on objects to distinguish resalable objects and non-resalable (i.e., not being able to be resold) objects. Then, the user through the client device can identify what is a resalable object and what is a non-resalable object by visiting a web page corresponding to the URI.

The request reseller form handler (reseller form handler) 2080 receives a request of a reseller form (i.e., a form that needs to be filled out by a user (e.g., a current owner of an object) who wants to be a reseller of an object) from a client device (e.g., client device 1030) being operated by a user (e.g., a user 1040). Upon receiving the request of the reseller form, the reseller form handler 2080 generates the reseller form associated with the object whose current owner wants to be a reseller. Then, the reseller form handler 2080 provides the generated reseller form to the client device. In one embodiment, the reseller form handler 2080 receives an objectID (i.e., a unique ID of an object whose current owner wants to be a reseller) and a sellerID (i.e., an Identification number (e.g., a phone number, social security number, an email address) of an original seller (i.e., a seller who sold the object at the first time, who has a right to sell the object to other people, and who has a right to modify the object) of the object) as inputs from the client device. In another embodiment, the sellerID is retrieved from a database (e.g., a server database 2120) associated with the objectID, when the reseller form handler 2080 accesses the database with the objectID. Then, the reseller form handler 2080 generates a reseller form based on the objectID and the sellerID.

In a further embodiment, an original seller makes a reseller form for each object that can be resold and stores the reseller form in a database (e.g., a server database 2120). Upon receiving the objectID and the sellerID as inputs, the reseller form handler 2080 accesses the database and retrieves a stored reseller form associated with the objectID and/or the sellerID. Then, the reseller form handler 2080 provides the retrieved reseller form to the client device being operated by the user. In another embodiment, the view object handler 2070 adds a mark-up on an object that can be customized and/or that can be resold. The mark-up includes a reseller form for each object that can be resold. Upon receiving a request of a reseller form, the reseller form handler 2080 automatically obtains a reseller form from a mark-up of an object of which a request of a reseller form is received. Then, the reseller form handler 2080 provides the reseller form to the client device.

Figure 6:
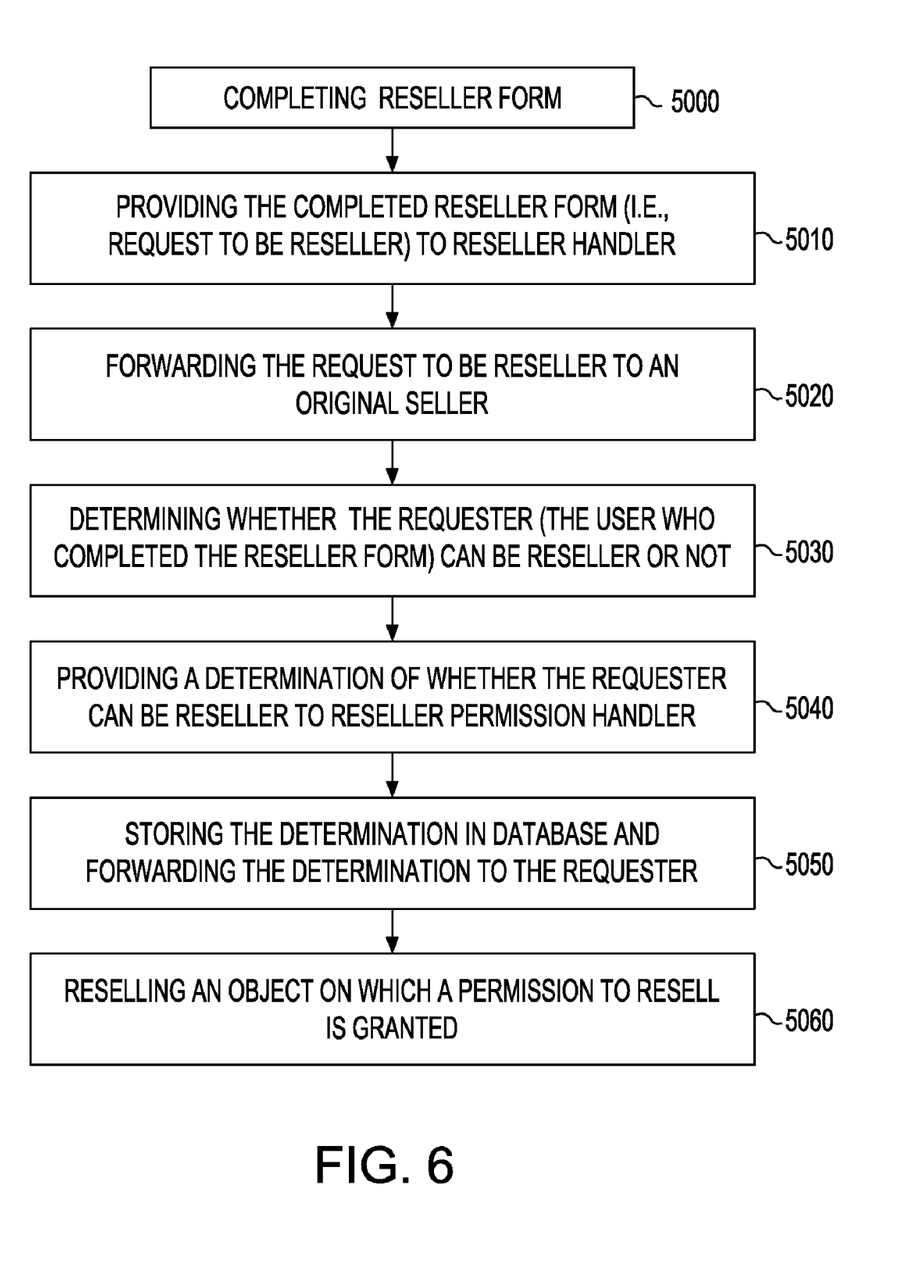
FIG. 6 depicts a flow chart of obtaining a reselling permission (i.e., an original seller allows a current owner of an object to resell the object to other users) in one embodiment of the present invention.

FIG. 6 illustrates a flow chart of obtaining a reselling permission from an original seller. Upon receiving the reseller form from the reseller form handler 2080, the client device completes the reseller form generated from the reseller form handler 2080 at step 5000 and submits the completed reseller form (i.e., a request to be reseller) to the reseller handler (the request to be reseller handler) 2090 at step 5010. Then, the reseller handler 2090 acknowledges to the client device that a request to be a reseller has been submitted from the client device. The acknowledgement from the reseller handler 2090 comprises, but is not limited to include: an original seller's information (e.g., name, phone number, email address, mailing address), a requester's information (i.e., the requester refers to the client device of the user who submits the completed reseller form to the reseller handler 2090; e.g., name, phone number, email address and mailing address of the user), information (e.g., objectID) of the object (i.e., an object that requester wants to resell), etc. In one embodiment, the reseller handler 2090 receives a request to be a reseller from the client device (e.g., client device 1030) that completed the reseller form. In this embodiment, the request to be reseller is a summary of contents of that completed reseller form. The request to be reseller comprises, but is not limited to include: an original seller's information (e.g., name, phone number, email address, mailing address), a requester's information (i.e., the requester refers to the client device of the user who submits the completed reseller form to the reseller handler 2090; e.g., name, phone number, email address and mailing address of the user), information (e.g., objectID) of the object (i.e., an object that requester wants to resell), etc.

After receiving the request to be a reseller from the client device, at step 5020, the reseller handler 2090 forwards the request to be a reseller to the original seller via an email, a postal mail, an instant messaging, a FAX, a phone call and a carrier service. In one embodiment, the reseller handler 2090 receives a requesterID (i.e., an identification associated with the requester who wants to be a reseller; e.g., a phone number, email address and social security number of the requester), an objectID and a sellerID as inputs. These inputs are provided from the client device and/or the reseller form handler 2080. As an output, the reseller handler 2090 sends a message (i.e., a message describing the requester associated with the requesterID wants to be a reseller of the object associated with the objectID) to the original seller associated with the sellerID.

Upon receiving the message from the reseller handler 2090, at step 5030, the original seller determines whether the user of the client device can be a reseller of the object or not, based on a copyright of the object or commissions that the requester would provide upon reselling the object. At step 5040, the determination of the original seller is provided to the reseller permission handler 2100 via an email, a postal mail, an instant messaging, a FAX, a phone call and a carrier service. After receiving the determination from the original seller, at step 5050, the reseller permission handler 2100 stores the determination in a database (e.g., a server database 2120) associated with the objectID and forwards the determination to the client device (e.g., the client device associated with requesterID). If the determination indicates an approval to be a reseller, at step 5060, the user (i.e., a person associated with requesterID) of the client device can resell the object (i.e., an object associated with the objectID) to other users. In one embodiment, the other users also operate computing devices. The original seller also operates a computing device. If the determination indicates a disapproval to be a reseller, the user cannot resell the object. Other users can purchase the object only through the original seller. In one embodiment, when the original seller determines the user can resell the object, the original seller transfers a copyright ownership, trademark ownership or intellectual property ownership associated with the object from the original seller to the user.

In one embodiment, the reseller handler 2090 forwards the request to be the reseller (e.g., a completed reseller form) from the client device to the reseller permission handler 2100 along with requesterID, objectID and sellerID. Then, the reseller permission handler 2100 determines whether the request to be the reseller can be accepted or not without contacting the original seller associated with the sellerID. Upon receiving the request to be the reseller, the reseller permission handler 2100 access a database associated with the objectID and retrieves information of whether the original seller allows reselling the object associated with the objectID. Then, the reseller permission handler 2100 provides the retrieved information to the client device associated with the requesterID.

Returning to FIG. 3, the object order form handler 2050 receives a request of an object order form associated with an object from a client device associated with a user. In one embodiment, the object is found in the modified web page provided from the view objects handler 2070 to the client device. Upon receiving the request of the object order form associated with object, the object order form handler 2050 generates the object order form associated with the object (e.g., by retrieving the object order form from a database associated with the object). Then, the object order form handler 2050 sends the object order form to (the user of) the client device via a web site (e.g., FTP site), an email, a phone call, a FAX, an instant messaging, a postal mail, a carrier service, etc. In one embodiment, the object order form (e.g., FIG. 1 an object order form 120) specifies customizations (e.g., changing attributes of the object) of the object, e.g., a software object (e.g., widget) in the embodiment illustrated. The attributes of the object comprises, but is not limited to include, a color, shape, text, length, size, font, etc. In one embodiment, the user through the client device provides his/her information (e.g., requesterID) and information associated with the object (e.g., objectID) to the object order form handler 2050. Then the object order form handler 2050 generates an object order form based on information of a seller of the object (e.g., an email address, phone number and/or address of the seller), information of the user of the client device (e.g., an email address, phone number and/or address of the user) and information (e.g., an unique ID) of the object. The information of the seller can be retrieved from a database (e.g., a server database 2120) associated with the sellerID and/or the objectID. The information of the user can be retrieved from a database (e.g., a server database 2120) associated with the requesterID. In a further embodiment, the object order form further includes information of a template (e.g., a general style) of the object, a current owner of the object, a price of the object, other instances of the object (e.g., other customized instances of the object) and/or a version of the object.

In one embodiment, the object order form handler 2050 receives an objectID and a sellerID as inputs. The objectID is provided from a client device who viewed the object (an object associated with the objectID) in the modified web page provided from the view objects handler 2070. When the client device provides the objectID to the object order form handler 2050, the object order form handler 2050 accesses a database associated with the objectID to retrieve a corresponding sellerID. After obtaining the objectID and the sellerID, the object order form handler 2050 retrieves an object order form from the database associated with objectID and/or the sellerID and forwards the object order form to the client device.

After the client device completes the object order form associated with object, the client device submits the completed object order form to the object order handler 2060. The object order handler 2060 treats the completed object order form as an order of the object. Then, the object order handler 2060 forwards the completed object order form to a seller (e.g., a reseller or an original seller) of the object. In one embodiment, when the client device completes the object order form of the object, an order of the object is issued from the client device (e.g., by clicking "order" button (e.g., an order button 140 in FIG. 1) on the object order form) and then the order of the object is provided to the object order handler 2060. In one embodiment, the order of the object is generated by parsing and analyzing the completed object order form using a compiler technology. After receiving the order of the object from the client device, the object order handler 2060 sends the order of the object to a corresponding seller via a web site (e.g., FTP site), an email, a FAX, an instant messaging, a postal mail and/or a carrier service. The corresponding seller can be found in the mark-up on the object in the modified web page provided from the view objects handler 2070. The corresponding seller can be found in a database associated with the object.

In one embodiment, the object order handler 2060 receives an objectID corresponding to the object, a description of customizations, requesterID and a sellerID as inputs. In one embodiment, the object order handler 2060 receives the completed object order form that includes the objectID, the description of customization, requesterID and the sellerID. Then, the object order handler 2060 sends an order of the object based on the completed object order form to a seller associated with the sellerID.

The add object handler 2110 receives an object, an objectID associated with the object, information (e.g., name, phone number, email address, mailing address) of a seller and a sellerID associated with the seller as inputs from the seller associated with the sellerID. In one embodiment, the add object handler 2110 further receives optional properties (e.g., whether a customization is possible; which attributes (e.g., colors, shapes, texts, etc.) of the object can be customized) of an object associated with the objectID from the seller. In a further embodiment, when the object associated with the objectID is a composite object (e.g., an object comprising subobjects), the add object handler 2110 additionally receives objectIDs and sellerIDs of subobjects of the composite object as inputs. When the add object handler 2110 receives an object (e.g., a customized object, an existing object or a composite object) from the seller of the object, the add object handler 2110 adds the object (i.e., the object provide from the seller) associated the objectID and the sellerID to a database associated with the objectID and/or the sellerID. When adding the object to the database, the add object handler 2110 may also add the information of the seller and the optional properties of the object into the database associated with the objectID and/or the sellerID. If the added object is a composite object, the add object handler 2110 may also enter objectIDs and sellerIDs of the subobjects into the database associated with the objectID of the composite object.

When a customized instance of the object is created or designed by the seller per a request from a customer, the add object handler 2110 adds the customized instance of the object to the database associated with the objectID of the object. In one embodiment, when the customized instance of the object is entered to the database, the add objects handler 2110 also adds a description of the customized instance (e.g., what attributes has been changed from an original instance of the object; which subobject has been changed if the object was a composite object), a price of the customized instance and/or a property of reselling (e.g., whether an owner of the customized instance can resell the customized instance).

When a current owner of the object obtains a permission to be a reseller of an object from an original seller, the add object handler 2110 adds the permission into the database associated with the object. Then, the add object handler 2110 provides a new sellerID to the current owner of the object who obtains a right to resell the object. In one embodiment, the permission (i.e., the permission added to the database) includes commission information (e.g., 5% of reselling price is assigned to an original seller) of an original seller.

The server database is a database management system (e.g., Oracle®, IBM® DB 2™, IBM® Informix®). The server database provides a creation, deletion and modification of persistent data (e.g., object being ordered, object being customized, object being resold) and is accessed by the handlers 2050-2110. In one embodiment, the server database includes a separate storage device to store and mange the persistent data.

Figure 4:
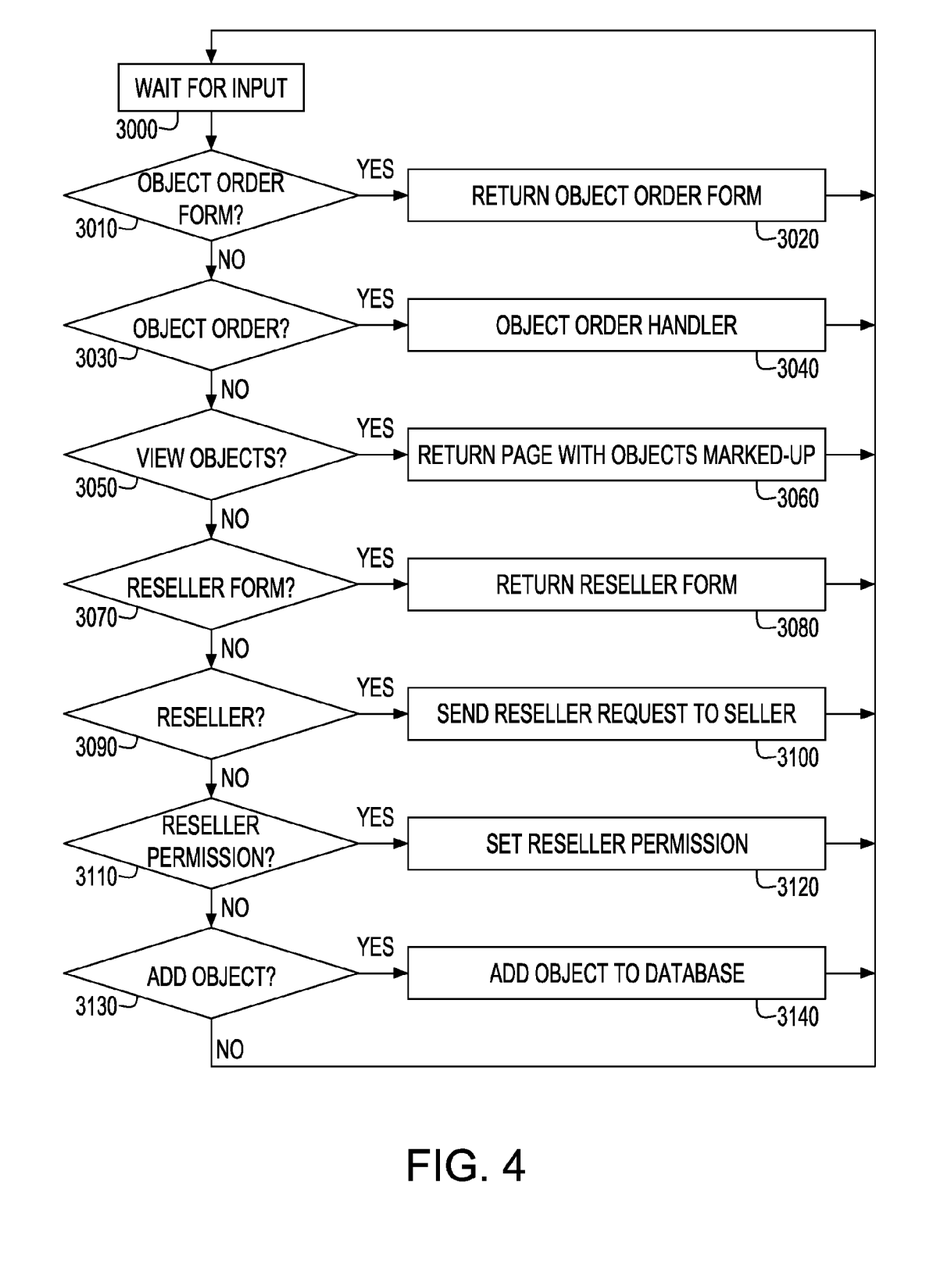
FIG. 4 depicts a flow chart of a methodology which a server device employs in one embodiment of the present invention.

FIG. 4 is a flow diagram illustrating a control flow of the server device (e.g., a server device 1010 in FIG. 2) for ordering, customizing and reselling an object. At step 3000, the server device waits an input from a client device (e.g., a client device 1030 in FIG. 2) which is used for a customer (who wants to purchase an instance of an object) and/or is used for a seller (who wants to sell an instance of the object through the server device). When the server device receives an input from the client device, at step 3010, the server device evaluates whether the input is a request for an object order form (e.g., an object order form 120 in FIG. 1). If the input is the request of the object order form, at step 3020, the server device invokes the object order form handler 2050 to generate the object order form and to send the object order form to the client device (the client device requested the object order form). Then, the server device returns to the step 3000 and waits another input from a client device.

When the input (the input evaluated at the step 3010) is not the request of the object order form, at step 3030, the server device evaluates whether the input is an order of an object (e.g., a completed object order from a client device). If the input is the order of the object, at step 3040, the object order handler 2060 is invoked to process (e.g., parsing, analyzing) the order of the object, acknowledge a receipt of the order to the client device (client device which sent the order) and to send the order to a seller of the object. Then, the server device returns to the step 3000 and waits another input from a client device.

When the input (the input evaluated at step 3030) is not the order of the object, at step 3050, the server device evaluates whether the input is a request to view objects. If the input is the request to view objects, at step 3060, the server device invokes the view objects handler 2070 to provide the objects to the client device (client device that requested viewing objects) with a visibly identifiable form (e.g., a web page with a mark-up on orderable objects, a photo catalog including objects along with objectIDs and sellerIDs). Then, the server device returns to the step 3000 and waits another input from a client device.

When the input (the input evaluated at step 3050) is not the request of viewing objects, at step 3070, the server device evaluates whether the input is a request of a reseller form. If the input is the request of the reseller form, at step 3080, the server device invokes the (request) reseller form handler 2080 to generate the reseller form (e.g., by retrieving the reseller form from a database associated with an object for which the request of the reseller form is submitted to the server device) and to provide the reseller form to the client device (client device that sent the request of the reseller form to the server device). Then, the server device returns to the step 3000 and waits another input from a client device.

When the input (the input evaluated at step 3070) is not the request of the reseller form, at step 3090, the server device evaluates whether the input is a request to be a reseller (e.g., a completed reseller form). If the input is the request to be the reseller, at step 3100, the server device invokes the (request to be) reseller handler 2090 to forward the request to be the reseller to an original seller. Then, the server device returns to the step 3000 and waits another input from a client device.

When the input (the input evaluated at step 3090) is not the request to be the reseller, at step 3110, the server device evaluates whether the input is a determination of the request to be the reseller from the original seller. If the input is the determination of the request, at step 3120, the server device invokes the reseller permission handler 2100 to store or set the determination in a database associated with the original seller, the client device (client device which sent the request to be the reseller) and/or a corresponding object After storing the determination in the database, the reseller permission handler 2100 sends the determination to the client device. Then, the server device returns to the step 3000 and waits another input from a client device.

When the input (the input evaluated at step 3110) is not the determination of the request to be the reseller, at step 3130, the server device evaluates whether the input is a request of adding an object in a database. If the input is the request of adding the object in the database, at step 3140, the server device invokes the add object handler 2110 to add the object in the database associated with the client device (client device that requested adding an object in a database). Then, the server device returns to the step 3000 and waits another input from a client device. When the input (the input evaluated at step 3130) is not the request of adding the object in the database, the server device returns to the step 3000 and waits an input from a client device.

Figure 5:
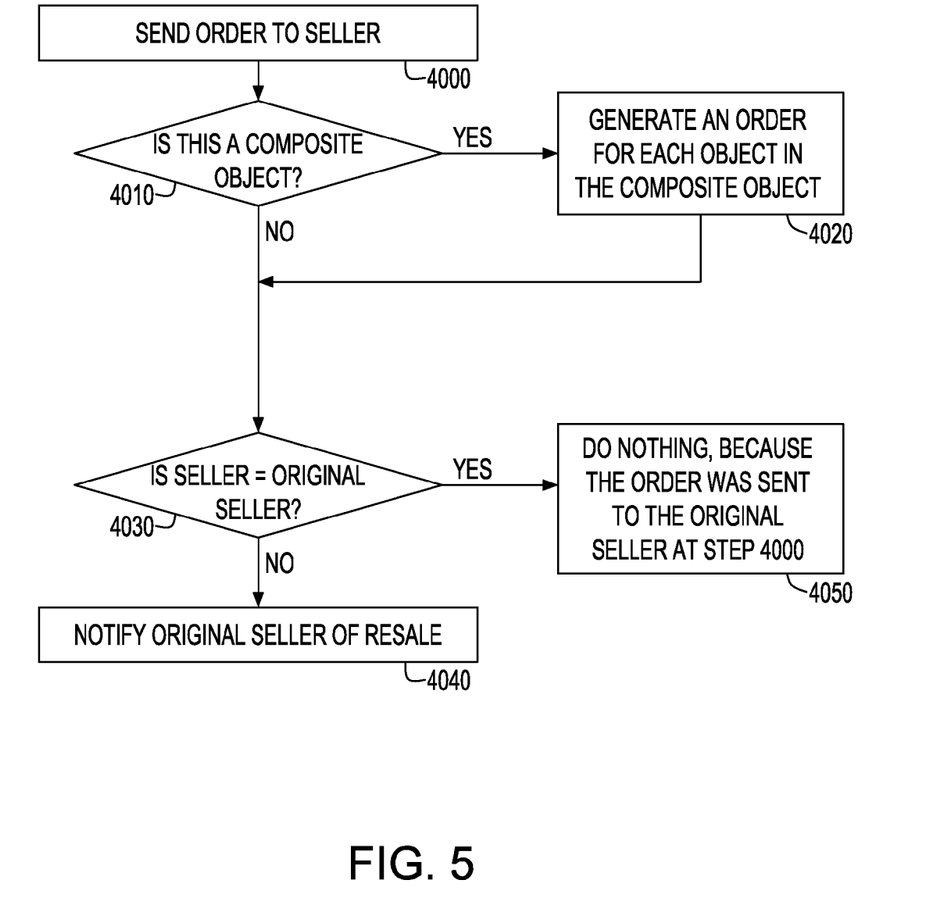
FIG. 5 depicts a flow chart of a methodology which an object order handler employs in one embodiment of the present invention.

FIG. 5 is a flow diagram illustrating a control flow of the object order handler 2060 (i.e., a handler responsible for processing an order of an object) in one embodiment of the present invention. When an order of an object is received at the server device (e.g., a server device 1010 in FIG. 2), at step 4000, the object order handler 2060 sends the order to a seller associated with the object. At step 4100, the object order handler 2060 evaluates whether the object is a composite object or not. If the object is the composite object, the object order handler 2060 generates each separate order for each subobject in the composite object. In a multi-threaded environment or multi-processing environment, there can be multiple object order handlers to process orders of subobjects. For example, an object order handler 2060 executed in a thread or in a processing core (i.e., a processing unit in a multi-processor) processes an order of a subobject.

After each order of each subobject is processed by object order handler(s) 2060 or if the object (the object evaluated at step 4010) is not a composite object, at step 4030, it is evaluated whether the seller who received the order at step 4000 is an original seller (i.e., a person who has a proprietary right on the object) of the object. If the seller is the original seller, at step 4050, the object order handler 2060 does not perform any action. Because the object order handler 2060 already sent the order of the object to the original seller at step 4000. If the seller is not the original seller, the object order handler 2060 notifies the original seller that the object is being resold.

One embodiment of the present invention includes a logic or a module for automatically charging an amount of money to a customer using a client device based on a price of an object. After the object order handler 2060 processes an order of an object, the object order handler 2060 invokes the logic to assist the client device of the customer to be able to pay the price of the object. In one embodiment, the object order form (e.g., an object order form 120 in FIG. 1) generated from the object order form handler 2050 includes the price of the object. Therefore, the customer recognizes the price of the object when completing the object order form. In one embodiment, the logic retrieves the price of the object from a database associated with the object and then displays that the price of the object via GUI (Graphical User Interface). In one embodiment, the logic accepts a number displayed on a credit card, a debit card, a traveler's check or a money order from the client device and then transfers the certain amount of money from an account (e.g., a saving account or checking account) of the customer to an account of a seller. In another embodiment, the logic allows the client device to pay the price of the object through an e-commerce business service (e.g., PayPal®).

In one embodiment, an object can be a composite object comprising subobjects. The subobjects can be hardware, software, service, and/or combinations of them. When a customer using a client device wants a customization on the composite object, the object order form handler 2050 generates an object order form that specifies available customizations of subobjects in the composite object. The available customizations are, but are not limited to, changing a subject with a new subobject, combining two subobjects into a subobject, changing a color of a subobject, changing a software in a subobject, changing a software subobject with a hardware subobject, etc. In one embodiment, the customer specifies customizations of a composite object in an object order form. Then, the object order handler 2060 parses and analyzes the object order form to identify which subobject needs to be customized and how subobject(s) need to be customized. Then, the object order handler 2060 calculates a price of the customizations of the composite object and sends a message to the customer with the price of the customizations and an expected delivery date of the customized composite object. Upon receiving the message including the price, the customer using the client device can cancel an order of the customized composite object within a predetermined period (e.g., within 1 day after receiving the message) or can place the order of the customized object by paying the price of the customizations through the logic (i.e., the logic assisting a customer to pay the price of the customizations), an e-commerce business service (e.g., PayPal®) and/or a money transfer service from a bank.

When an order of customizations of a composite object is placed, the object order handler 2060 first evaluates whether the customizations has been performed before by searching a database associated with the composite object. If there is an instance of the composite object that has been customized as requested from the customer, the instance of the composite object is delivered to the customer. When there is no instance of the composite object that satisfies the customizations requested from the customer, the object order handler 2060 determines which subobject needs to be sent to a seller to be modified. If the parsing and analyzing (parsing and analyzing performed before to calculate the price of the customizations) identified there a customized instance of a subobject that satisfies a customization request from the customer, the customized instance of the subobject is retrieved from a database associated with the subobject. If a customized instance of a subobject that satisfies a customization request from the customer is not found in databases, the object order handler 2060 sends an order of the subobject with a description of the customization to a seller associated with the subobject. Then, the seller creates or designs a customized instance of the subobject. After creating or designing the customized instance of the subobject, the seller sends the customized instance of the subobject to the server device.

When the server device receives customized instance(s) of subobject(s), the add object handler 2110 adds the customized instances of the subobjects to database(s) associated with the subobjects and notifies other handlers 2050-2100 that the customized instances of the subobjects are entered into databases. After receiving the notice from the add object handler 2110, the object order handler 2060 retrieves customized instances of the subobjects modified based on the specified customizations from the customer using the client device. When all necessary instances of subobjects (e.g., customized or uncustomized subobjects) are retrieved from database(s), the object order handler 2060 sends all the necessary instances of the subobjects to a composer associated with the composite object. Upon receiving all the instances of the subobjects, the composer combines the instances based on the specified customizations from the customer using the client device. When completing combing all the necessary instances of the subobjects to create a customized instance of the composite object, the composer sends the customized instance of the composite object to the server device. Then, the add object handler 2110 adds the customized instance of the composite object made of the all the necessary instances of the subobjects into a database associated with the composite object and notifies other handlers that the customized instance of the composite object is entered to the database. Upon receiving the notifying, the object order handler 2060 retrieves the customized instance of the composite object from the database and sends the customized instance of the composite object to the customer using the client device.

Although the preferred embodiments of the present invention have been described in detail, it should be understood that various changes and substitutions can be made therein without departing from spirit and scope of the inventions as defined by the appended claims. Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention. In addition, the present invention includes a method of deploying a computer program product including a program of instructions in a computer readable medium. The program of instructions is executed by a processor.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed:

1. A computer-implemented method in a server device for reselling and customizing an object in a client-server environment including a plurality of client devices, the object including one or more subobjects, the method comprising:
   receiving from a client device a request of a reseller form corresponding to the object, generating the reseller form corresponding to the object and providing the reseller form to the client device;
   receiving a request to be a reseller from the client device that completed the reseller form and forwarding the request to be the reseller to an original seller; and
   receiving a determination of the request to be the reseller from the original seller, storing the determination in a database and sending the determination to the client device
   receiving an object order form, from another client device, specifying customization of the one or more subobjects in the object;
   determining which subobject needs to be customized and how the subobject is customized, based on the received object order form;
   calculating cost of a customization of each subobject in response to determining that which subobject needs to be customized and how the subobject is customized;
   determining cost of a customization of the object, based on the calculated customization cost of each subobject;
   informing the another client device of the determined cost of the customization of the object and an expected delivery date of the customized object; and
   reselling the customized object to the another client device if the received determination indicates an approval of the request to be the reseller.

2. The computer-implemented method according to claim 1, further comprising:
   receiving a request of viewing the object from the another client device, finding the object on a web page, modifying the web page by adding a mark-up to indicate the object can be resold and sending the modified web page to the another client device;
   receiving a request of the object order form associated with the object in the modified web page from the another client device, generating the object order form of the object and providing the object order form of the object to the another client device; and
   receiving an order of the object from the another client device that completed the object order form of the object and sending the order of the object to the reseller.

3. The computer-implemented method according to claim 2, wherein the object order form specifies customizations of the object in the modified web page.

4. The computer-implemented method according to claim 2, wherein the object order form is provided to the another client device via one or more of: a web site, an email, a phone call, a fax, an instant messaging, a postal mail and a carrier service.

5. The computer-implemented method according to claim 2, wherein the object order form includes information of the reseller, information of a user and information of the object.

6. The computer-implemented method according to claim 2, wherein the object order form is associated with one or more of: a template of the object, an owner of the object, a price of the object other instances of the object and a version of the object.

7. The computer-implemented method according to claim 6, further comprising:
   automatically charging an amount of money to the another client device based on the price of the object.

8. The computer-implemented method according to claim 2, further comprising:
   retrieving instances of the subobjects modified based on the specified customization; and
   sending an instance of the object made of the instances of the subobjects to the another client device.

9. The computer-implemented method according to claim 1, wherein the object is one or more of: software, hardware and a service.

10. The computer-implemented method according to claim 1, wherein the object includes an unique ID.

11. A program storage device, readably by machine, tangibly embodying a program of instructions executable by a machine to perform method steps for reselling and customizing an object in a client-server environment including a plurality of client devices, said method steps comprising the steps of claim 1.

* * * * *